United States Patent [19]
Zabower

[11] 3,764,209
[45] Oct. 9, 1973

[54] HAND-HELD PHOTOMICROSCOPE

[75] Inventor: Harry R. Zabower, Campbell, Calif.

[73] Assignee: The United States of America as represented by the Administrator of the National Aeronautics and Space Administration

[22] Filed: Sept. 13, 1972

[21] Appl. No.: 288,857

[52] U.S. Cl. .................................... 355/18, 95/12
[51] Int. Cl. ............................................ G03b 29/00
[58] Field of Search............................ 95/12; 355/18

[56] References Cited
UNITED STATES PATENTS

| | | | |
|---|---|---|---|
| 2,910,913 | 11/1959 | Michel | 95/12 X |
| 3,490,347 | 1/1970 | Seedhouse | 95/12 |
| 3,623,807 | 11/1971 | Gabler | 355/18 |

*Primary Examiner*—Samuel S. Matthews
*Assistant Examiner*—Michael D. Harris
*Attorney*—Armand G. Morin, Sr. et al.

[57] ABSTRACT

A hand-held, small, portable, lightweight photomicroscope is provided including a housing having a top plate, an objective lens removably mounted on the top plate and extending in a viewing direction upwardly from the plate, a specimen holder adjustably mounted on the top plate and extending upwardly therefrom to hold a specimen above the upper end of the objective lens, a light source movably mounted on the top plate so as to direct light onto the specimen, and a lens system within the housing including a beam splitter for splitting the light beam emerging within the housing from the objective lens into two beams, one beam being directed to a camera mounting device on the housing where the lens system of a suitable camera mounted on the housing is positioned and the other beam being directed onto the lens system of a suitable eyepiece mounted on the housing for viewing of the specimen by the operator. Control means is mounted on the housing for operating the shutter of the camera therefrom, and means is provided within the housing for securely storing one or more extra objective lenses for replacement of the objective lens in use.

19 Claims, 6 Drawing Figures

PATENTED OCT 9 1973                          3,764,209
SHEET 3 OF 3
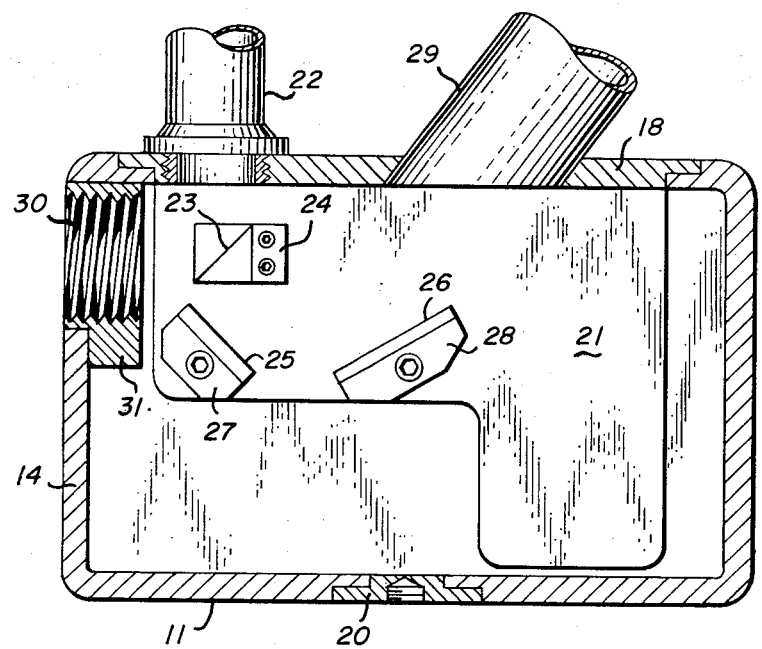
Fig_4
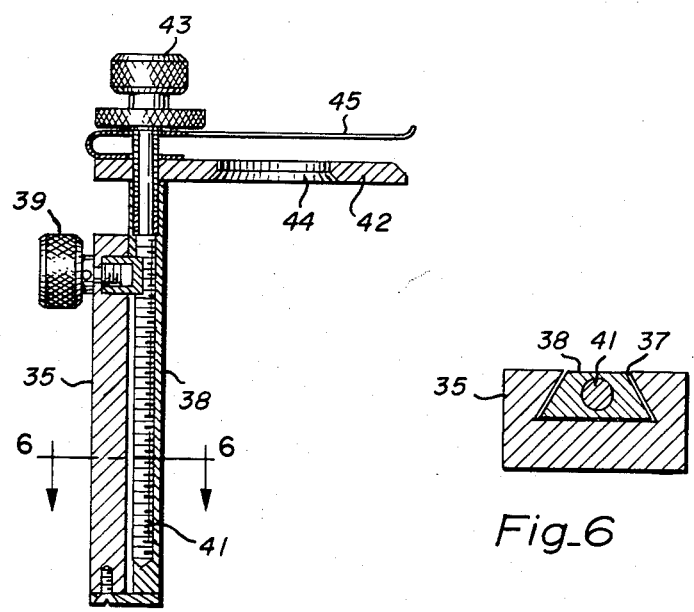
Fig_5
Fig_6

HAND-HELD PHOTOMICROSCOPE

The invention described herein was made by an employee of the United States Government and may be manufactured and used by or for the Government for governmental purposes without the payment of any royalties thereon or therefor.

BACKGROUND OF THE INVENTION

The standard form of photomicroscope in present day usage is a laboratory instrument not suited for portable, hand-held applications in the field. The specimens to be examined and photographed are collected in the field and removed to a suitable location such as a laboratory for processing. Attempts to provide a portable hand-held instrument for field use have generally resulted in heavy and bulky devices with limited use for simultaneous viewing and photographing.

SUMMARY OF THE PRESENT INVENTION

The present invention provides a small, lightweight, compact, hand-held photomicroscope providing simultaneous viewing and photographing, with adjustable specimen illumination and exchangable camera format.

The novel photomicroscope comprises a main housing having a top plate, bottom plate, and side walls. The objective lens is mounted on the top plate in an inverted manner relative to the normal type of mounting, i.e., mounted so as to be viewing upwardly from the housing, and focuses on a specimen holding structure mounted on the top plate and extending over the upper end of the objective lens. The specimen holding structure comprises an adjusting mechanism for adjustably moving the specimen vertically along an axis extending through the objective lens as well as transverse of the axis.

A lens system within the housing serves to split the beam of light emerging from the objective lens and into the housing into two paths, one path extending to an eyepiece mounted on the top plate where the specimen may be viewed by the operator. The other path extends to a camera mounting means on the housing adapted to mount a motion picture, still, or television camera system in alignment with the path of said second beam. The lens system within the housing comprises a beam splitter for directing one beam along a path via a pair of reflectors including a 45° reflector and a 30° reflector to the eyepiece, and for directing the other beam along a path to the camera mount.

A light source is mounted on the top plate and extends over the specimen holder to direct light onto the specimen. The light holder is adjustable so that the light may be moved relative to the sample holder. A rheostat device is mounted on the top plate and coupled to the power supply for the light source so that the intensity of the light may be varied.

The housing is provided with a support means therein for securely holding extra objective lenses in a protective manner, these lenses being easily accessible for use as replacements for the objective lens in use.

BRIEF DESCRIPTION OF THE DRAWINGS

FIG. 4 is a cross-section view of the photomicroscope showing the internal wall in the housing from the side opposite to the view of FIG. 1.

FIG. 5 is a cross-section view of the specimen holder device taken along section line 5—5 in FIG. 1.

FIG. 6 is a cross-section view of the specimen holder device taken along section line 6—6 in FIG. 5.

DESCRIPTION OF THE PREFERRED EMBODIMENTS

Figure 1:
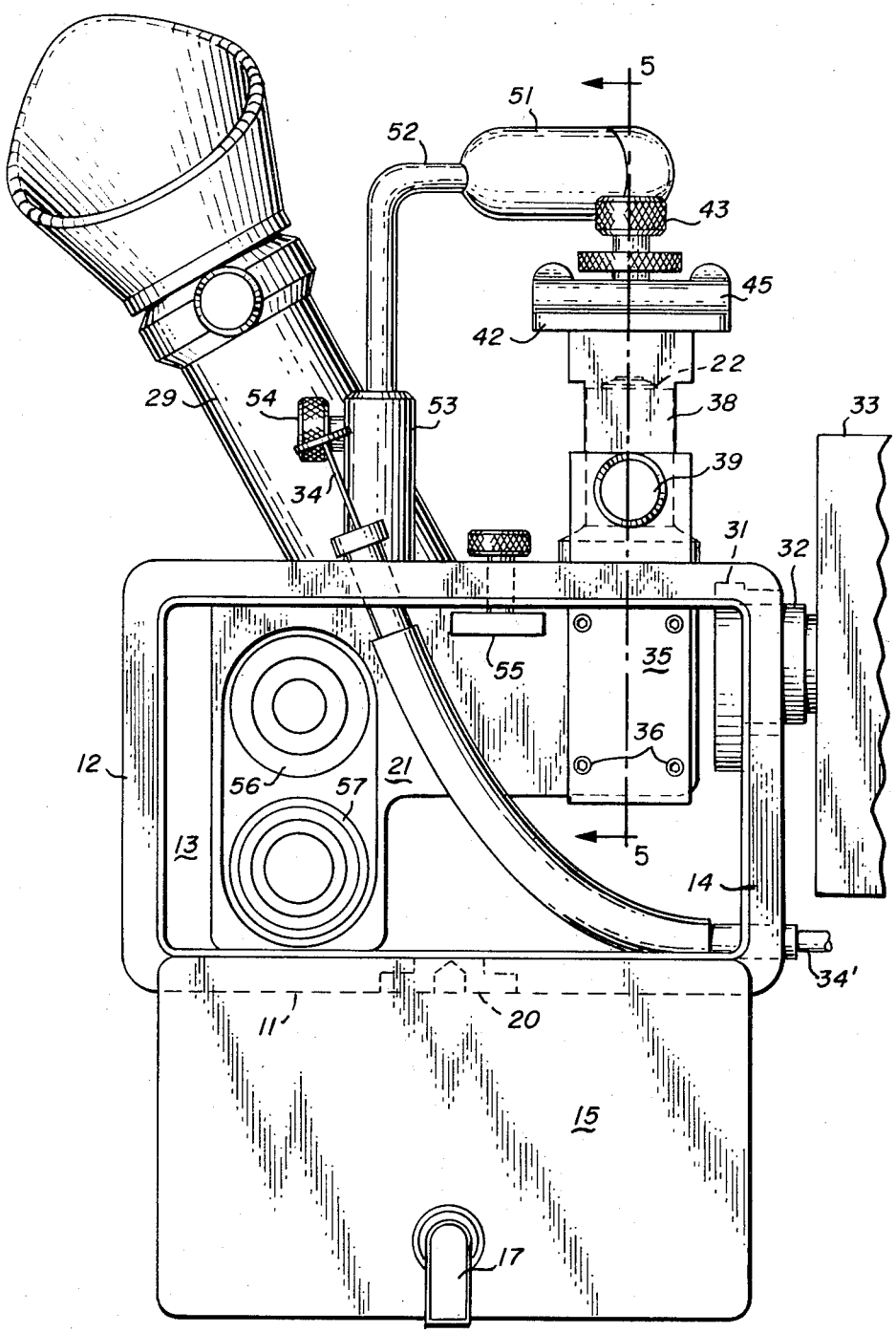
FIG. 1 is a side view of the portable photomicroscope of the present invention.
Figure 2:
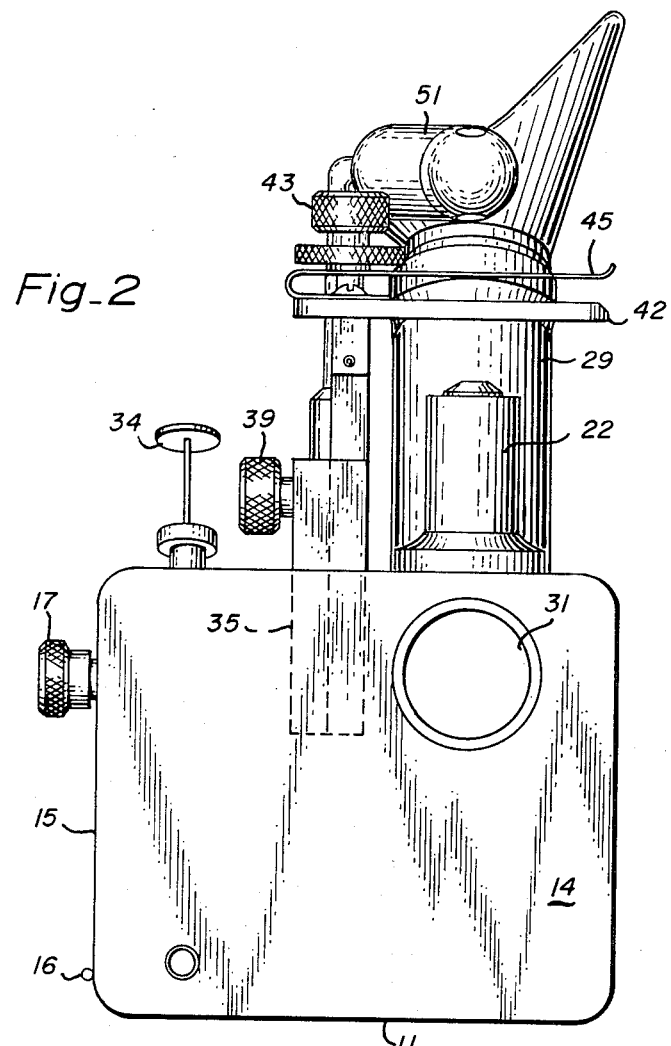
FIG. 2 is another side view of the photomicroscope taken from the right hand side of FIG. 1 with the camera removed.
Figure 3:
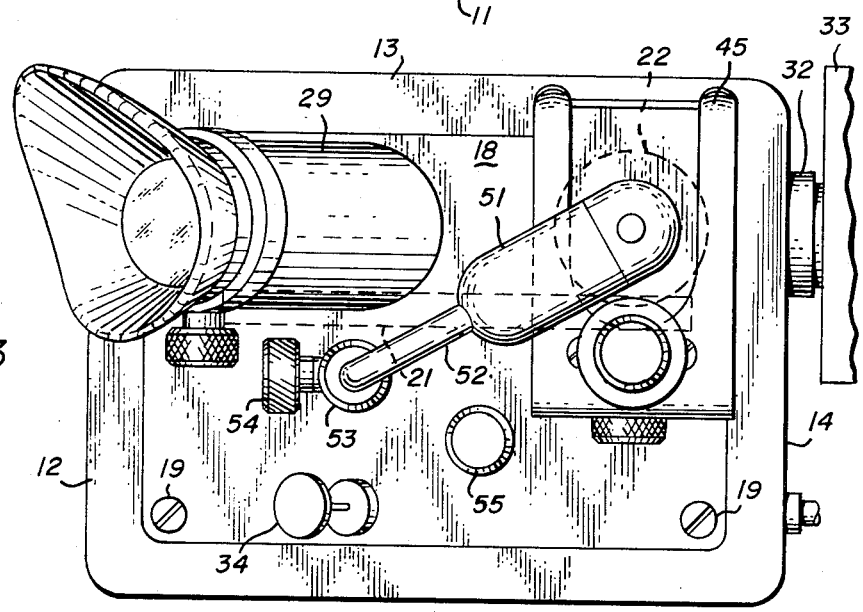
FIG. 3 is a top view of photomicroscope of FIG. 1.

Referring now to the drawings, the preferred embodiment of the present invention comprises a housing made of a strong lightweight material such as fiberglass including a bottom wall 11, three side walls 12, 13 and 14, and a fourth side wall formed by a door 15 mounted as by a hinge 16 on said housing and having a door latch 17 thereon, said door permitting access to the inner chamber of the housing. The door is shown in its open position in FIG. 1. A top plate 18 of a suitable strong lightweight material such as aluminum is mounted as by screws 19 on the housing and forms a cover therefor, the top plate being provided with an integral wall portion 21 extending from its under surface within the housing and approximately midway of the width of the top plate.

A coupler mount 20 is affixed to the under surface of the bottom wall 11 for use in mounting the unit on a tripod if desired.

The top plate 18 has a threaded bore therein into which one end of an objective lens 22 is threaded, the lens extending upwardly from the surface of the plate 18. A beam splitter 23 is mounted below the inner end of the objective lens on a splitter mount 24 fixedly secured to one side of the inner wall 21. A pair of light reflectors or mirrors 25 and 26 are mounted on the wall 21 on a 45° mirror mount 27 and a 30° mirror mount 28, respectively, so as to direct one beam from the beam splitter 23 in a path back from the axis of the objective lens 22 and then upwardly toward the top plate and into an eyepiece 29 fixedly secured in the top plate. The eyepiece 29 is oriented such that the operator may easily view the reflected image from the objective lens 22 while holding the photomicroscope in his hands. The other beam from the splitter 23 is directed axially to a threaded bore 30 in a camera mounting ring 31 secured in the side wall 14. This camera mount serves to secure the mating portion 32 of a suitable still camera 33, movie camera, television camera, or the like to the housing. A push control 34 is mounted in the housing and extends above the top plate 18 to provide control of the camera shutter to the operator, the outer end of the control rod 34 extending through the side wall 14 for coupling to the camera.

A specimen stage comprises an elongated guide member 35 extending through an opening in the top plate 18 and fixedly secured as by screws 36 to the inner wall 21, the guide member 35 being provided with a slideway 37 having a generally triangular shaped cross-section. An elongated carriage 38 is positioned in the guide member 35 for vertical sliding movement therein, a lock nut 39 being provided through the guide to lock the carriage 38 in the guide member 35 at a selected vertical position. This provides for coarse positioning of the specimen stage. An adjusting screw 41 is threaded through a threaded bore in the carriage 38, this adjusting screw carrying the slide platform 42 pivotally mounted on the unthreaded upper portion thereof. The adjusting screw 41 may be rotated by knob 43 to thereby provide fine vertical adjustment of the slide platform 42. The slide platform 42 may be rotated about the axis of the adjusting screw 41 to position the opening 44 in the platform in alignment with the upper end of the objective lens. A U-shaped slide spring 45 is mounted on the slide platform 42 and serves to hold the specimen glass on the platform.

A light fixture 51 carrying a suitable lamp is mounted on an L-shaped tubing 52 slidably and rotatably mounted in a support member 53 secured to the top plate. A set screw 54 in the support 53 permits the tubing 52 to be fixed in place once the lamp has been moved to its desired position. A battery (not shown) carried within the housing supplies power to the lamp via a rheostat 55 which is controlled by the operator to adjust the intensity of the light.

The inner wall 21 is provided with a pair of spaced-apart threaded bores for carrying a pair of spare objective lenses 56 and 57 securely and protectively within the housing.

Thus, there is provided a compact, lightweight, portable, self-contained photomicroscope suitable for field use. The specimen stage is adjustably mounted on the top of the housing for alignment of the specimen with the objective lens, the lens being directed upwardly from the top plate of the housing. A controllable light source provides illumination of the specimen held on the specimen stage. Two separate optical beam paths are provided, one for operator viewing via a standard eyepiece and one for recording the image in a camera.

What is claimed is:

1. A hand-held photomicroscope comprising a housing including a top plate, an objective lens mounted on said top plate and extending upwardly therefrom, a specimen stage mounted on said housing and including a specimen holding means positioned above the upper end of said objective lens for holding a specimen aligned with said objective lens, a light source mounted on said housing for directing light onto said specimen holding means, a lens system within said housing for providing an optical path for the light beam eminating from said objective lens within said housing, said lens system including a beam splitter for splitting said light beam into two paths, means on said housing for mounting a camera in one of said beam paths and external of the housing, and an eyepiece mounted on the outside of said housing in said second beam path whereby the image of said specimen may be viewed by the operator.

2. A photomicroscope as claimed in claim 1 wherein said specimen stage comprises means for adjustably moving said specimen holding means above said objective lens.

3. A photomicroscope as claimed in claim 2 wherein said lens system within the housing comprises a plurality of beam reflectors in one of said two beam paths.

4. A photomicroscope as claimed in claim 3 wherein said plurality of beam reflectors include a 45° reflector and a 30° reflector.

5. A photomicroscope as claimed in claim 3 wherein said eyepiece is mounted on said top plate and extends upwardly therefrom.

6. A photomicroscope as claimed in claim 2 wherein said means for moving said specimen holding means includes means for moving said holding means along the direction of a vertical axis extending through said objective lens and for moving said holding means transverse to said axis.

7. A photomicroscope as claimed in claim 1 including means mounted on said housing for controlling the intensity of the light from said light source.

8. A photomicroscope as claimed in claim 1 wherein said light source is mounted on said top plate, and including means for adjustably moving said light source relative to said specimen holding means.

9. A photomicroscope as claimed in claim 8 including means mounted on said housing for controlling the intensity of the light from said light source.

10. A photomicroscope as claimed in claim 1 including a side wall in said housing, said camera mounting means being mounted in said side wall.

11. A photomicroscope as claimed in claim 1 including means mounted on said housing and adapted to be coupled to said camera for controlling the shutter mechanism of said camera.

12. A photomicroscope as claimed in claim 1 wherein said lens system within the housing comprises a plurality of beam reflectors in one of said two beam paths.

13. A photomicroscope as claimed in claim 12 wherein said plurality of beam reflectors include a 45° reflector and a 30° reflector.

14. A photomicroscope as claimed in claim 12 including means mounted on said housing for controlling the intensity of the light from said light source.

15. A photomicroscope as claimed in claim 12 wherein said light source is mounted on said top plate, and including means for adjustably moving said light source relative to said specimen holding means.

16. A hand-held photomicroscope as claimed in claim 15 including means mounted on said housing for controlling the intensity of the light from said light source.

17. A photomicroscope as claimed in claim 1 including a side wall in said housing, said camera mounting means being mounted in said side wall.

18. A photomicroscope as claimed in claim 17 including means mounted on said housing and adapted to be coupled to said camera for controlling the shutter mechanism of said camera.

19. A photomicroscope as claimed in claim 1 including means within said housing for securely carrying one or more extra objective lenses therein.

* * * * *